Patented July 30, 1929.

1,722,871

UNITED STATES PATENT OFFICE.

WALTER WEBER, OF DUSSELDORF, AND MAX JACOBI, OF BENRATH-ON-THE-RHINE, GERMANY.

PROCESS OF PURIFYING CHEMICALS.

No Drawing. Application filed September 7, 1927, Serial No. 218,118, and in Germany December 24, 1926.

Our invention relates to a process of purifying chemicals intended for use as the raw materials in the manufacture of products contaning active oxygen. It is well understood that chemicals which are to be used for the manufacture of products containing active oxygen, must be very pure. Even very small quantities of impurities which are liable to exercise a decomposing effect by catalytic action on the so called "per compounds," reduce the yield to a large extent and moreover affect the durability of the product obtained. In the interest of economy in this branch of industry it is of par amount importance to avoid as far as possible the presence of any impurities having a catalytic action. For example, in the manufacture of perborates and percarbonates, the degree of purity of the raw materials, such as borax, caustic soda and calcined soda, cannot be too great. This applies more particularly to electrolytic processes of manufacture. Also in the manufacture of hydrogen peroxide, persulphates and perphosphates, the chemicals which act as oxygen carriers, must be submitted to a very thorough purification in order to free them from catalyzers.

This condition is generally dealt with by recrystallization. It has been found however that the yield of oxygen and the durability of the product are unfavourably affected by the presence in the starting material of catalytically acting substances in such minute quantities that they can not be practically ascertained for analysis. For example the small quantities of heavy metals which are normally contained in water from the tap and even in distilled water, are of considerable influence. Such metals seem to be chiefly manganese, copper and exceedingly small traces of platinum.

As a result of prolonged experiment we have found that these small quantities of catalyzers can be eliminated by treating the solutions of the raw materials to be purified, in a suitable manner with silica gel which appears to have the property of absorbing the disturbing catalayzers without limit. For example, a borax or soda solution, from which such quantities of heavy metal compounds as can be precipitated have preferably been previously separated, may, before it is crystallized, be boiled, while being stirred, with silica gel in the form of a powder. We have found that 2 kg. silica gel are sufficient for 1 cbc. m. of solution. The salts crsytallized out of the clear decanted solution, when converted into the corresponding percompound, give the highest yields and products of excellent durability.

The solutions of chemicals can also be stirred, while cold, with silica gel but the latter treatment takes a somewhat longer time. However, the latter treatment may be employed, for example, when it is not desired to separate the chemicals in a dry state from their solutions, and where the solutions themselves are to be used as, for instance, when preparing sodium perborate by the addition of hydrogen peroxide to a solution of sodium meta-borate.

As is known, silica gel is a glass-like, more or less fine-grained mass of pure silicic acid, which has a great internal surface development. (See for instance Meyer, Zeitschrift für angew. Chemie, vol. 37, 1924, pp. 36 and 209 and U. S. Patent No. 1297724.) The silica gel, after use, can be regenerated by washing, treatment with acid and subsequent heating, in the known manner.

It should be remarked that the invention is susceptible of modifications and changes to conform to varying conditions of application within the scope of the claims hereunto appended.

We claim:—

1. A process of removing catalytic substances from chemicals intended for use as the raw materials in the manufacture of products containing active oxygen, consisting in adding silica gel to the chemicals in solution and separating the solutions from silica gel.

2. A process of removing catalytic substances from chemicals intended for use as the raw materials in the manufacture of products containing active oyxgen, consisting in adding silica gel to the chemicals in solution, stirring the mixture and separating the solution from silica gel.

3. A process of removing catalytic substances from chemicals intended for use as the raw materials in the manufacture of products containing active oxygen, consisting in adding silica gel to the chemicals in solution, heating and stirring the mixture and separating the solution from silica gel.

4. A process of removing catalytic substances from chemicals intended for use as the raw materials in the manufacture of products containing active oxygen, consisting in adding silica gel to the chemicals in solution, heating and stirring the mixture, separating the solution from silica gel and allowing the solution to crystallize.

In testimony whereof we have hereunto set our hands.

WALTER WEBER.
MAX JACOBI.